US008247930B2

(12) United States Patent
Yamagishi

(10) Patent No.: US 8,247,930 B2
(45) Date of Patent: Aug. 21, 2012

(54) ACOUSTIC EXCITER AND SPEAKER USING IT

(75) Inventor: Kiyoshi Yamagishi, Mie (JP)

(73) Assignee: Panasonic Corporation, Osaka (JP)

( * ) Notice: Subject to any disclaimer, the term of this patent is extended or adjusted under 35 U.S.C. 154(b) by 680 days.

(21) Appl. No.: 12/300,552

(22) PCT Filed: May 28, 2007

(86) PCT No.: PCT/JP2007/060766
§ 371 (c)(1),
(2), (4) Date: Nov. 12, 2008

(87) PCT Pub. No.: WO2007/139046
PCT Pub. Date: Dec. 6, 2007

(65) Prior Publication Data

US 2009/0184589 A1 Jul. 23, 2009

(30) Foreign Application Priority Data

May 29, 2006 (JP) ................................. 2006-148064

(51) Int. Cl.
*H02K 41/035* (2006.01)
*H02K 1/34* (2006.01)

(52) U.S. Cl. .................. 310/12.16; 310/12.32; 381/354; 381/150

(58) Field of Classification Search ............... 310/12.16, 310/12.82; 381/385, 412, 354, 433, 396, 381/398, 366, 420, 150
See application file for complete search history.

(56) References Cited

U.S. PATENT DOCUMENTS 4,506,117 A * 3/1985 Fresard .......................... 381/162
4,577,069 A * 3/1986 Keezer ........................... 381/420
4,675,907 A * 6/1987 Itagaki et al. ................. 381/152
5,748,759 A * 5/1998 Croft et al. ..................... 381/398
6,208,237 B1 * 3/2001 Saiki et al. ................. 340/388.1
6,373,958 B1 * 4/2002 Enomoto et al. .............. 381/406
6,526,151 B1 * 2/2003 Peng ............................. 381/403
6,618,487 B1 * 9/2003 Azima et al. .................. 381/152
6,628,799 B2 * 9/2003 Fukuda .......................... 381/398
6,751,333 B1 * 6/2004 Azima et al. .................. 381/396
6,925,190 B2 * 8/2005 Popken et al. ................ 381/395
6,965,679 B1 * 11/2005 Bosio et al. ................... 381/152
(Continued)

FOREIGN PATENT DOCUMENTS

JP 2004-64726 A 2/2004
(Continued)

OTHER PUBLICATIONS

Chinese Office Action 200780013873.4 dated Jun. 24, 2011.

(Continued)

*Primary Examiner* — Ha Tran T Nguyen
*Assistant Examiner* — Jordan Klein
(74) *Attorney, Agent, or Firm* — Pearne & Gordon LLP

(57) ABSTRACT

An acoustic exciter comprises a suspension made of an elastic material, which is coupled to the opening part of a frame, and a vibrator to which a voice coil disposed in the magnetic gap of a magnetic circuit connected to the suspension is coupled. An elastic body is so disposed between the frame and the vibrator as to be pressed against the frame and the vibrator. Thereby, the exciting efficiency of the vibrator can be increased, and the performance and tone quality of the acoustic exciter can be improved.

12 Claims, 7 Drawing Sheets

U.S. PATENT DOCUMENTS

| | | | | |
|---|---|---|---|---|
| 7,181,040 | B2 * | 2/2007 | Ohta | 381/398 |
| 7,336,798 | B2 * | 2/2008 | Ono et al. | 381/433 |
| 7,787,650 | B2 * | 8/2010 | Miura | 381/396 |
| 2006/0110001 | A1 * | 5/2006 | Saint Vincent et al. | 381/396 |
| 2007/0081687 | A1 * | 4/2007 | Hayashi | 381/345 |
| 2007/0269076 | A1 * | 11/2007 | Honda et al. | 381/411 |

FOREIGN PATENT DOCUMENTS

| | | | |
|---|---|---|---|
| JP | 2004-064726 | A | 2/2004 |

OTHER PUBLICATIONS

International Search Report, Jul. 31, 2007.

* cited by examiner

ACOUSTIC EXCITER AND SPEAKER USING IT

TECHNICAL FIELD

The present invention relates to an acoustic exciter which vibrates a panel staff, such as an automobile cabin interior material, a house interior panel, etc., for reproducing sounds. A speaker which includes the acoustic exciter is also disclosed in the present invention.

BACKGROUND ART

An acoustic exciter is made by combining a magnetic circuit and a vibrator with a suspension having a spring property. Vibration is generated as the result of transaction between the magnetic circuit and the vibrator attracting/repelling to each other. The vibration is conducted to a vibration staff on which the acoustic exciter is mounted. A conventional acoustic exciter is described below referring to FIG. 8 which shows a cross sectional side view of acoustic exciter and FIG. 9 which shows an equivalent circuit diagram representing its mechanical system.

As shown in FIG. 8, a conventional acoustic exciter is formed of magnetic circuit 221 and vibrator 226. Magnetic circuit 221 includes yoke 222, magnet 223 and plate 224, and provides magnetic gap 221*a*. The magnetic circuit is connected to suspension 225 which is made of an elastic plate material. Vibrator 226 is formed of vibrating section 227, voice coil 228 connected to vibrating section 227, and frame section 229 which connects vibrating section 227 with suspension 225.

Vibrating section 227 and frame section 229 are integrally formed as a unitized body by means of resin molding.

When electricity is led to voice coil 228 of the above-structured acoustic exciter, attracting/repelling forces are generated with respect to magnetic circuit 221. Vibrator 226 and magnetic circuit 221 start vibrating, which vibration excites a vibration staff (not shown) connected to vibrating section 227. An acoustic exciter makes vibration staff to generate sounds, in this way.

Now, the operation of conventional acoustic exciter is described referring to FIG. 9. FIG. 9 shows an equivalent circuit diagram which represents the mechanical system of the acoustic exciter. In the circuit diagram, driving force $F_{va}$ generated by magnetic circuit 221 and voice coil 228, and electromagnetic damping resistance $Z_{ea}$ due to $F_{va}$ are shown in a series circuit. Suspension 225's compliance $Cs_1a$ to magnetic circuit 221, suspension 225's mechanical resistance $R_{s1a}$ to magnetic circuit 221, and mass $M_{ma}$ of magnetic circuit 221 and part of suspension 225 are shown in a series circuit. Also, mass $M_{f+v}$ of vibrating section 227, voice coil 228, frame section 229 and part of suspension 225 is shown. Suspension 225's compliance $C_{s2a}$ to vibrator 226, and suspension 225's mechanical resistance $R_{s2a}$ to vibrator 226 are shown in a series circuit. Magnetic circuit 221's vibration speed $V_{ma}$, vibrating section 227's vibration speed $V_a$, and frame section 229's vibration speed $V_{fa}$ are also shown.

As the equivalent circuit indicates, since vibrating section 227 for vibrating a vibration staff and frame section 229 share a unitized body their respective vibration speeds are the same, namely, $V_a=V_{fa}$. Patent Document 1 provides an example of known technology information related to the present invention.

The vibration mass of the above conventional acoustic exciter includes that of vibrator 226 consisting of vibrating section 227, voice coil 228 and frame section 229, and that of part of suspension 225. The vibration mass remains constant regardless of the frequency. Therefore, although it provides a substantial vibration by series resonance at the lowest resonance frequency $F_0$, the vibration decreases in other frequency region because energy is consumed by the load of the entire vibration mass. Loss due to the loading mass reveals its significance in the high frequency region; so is attenuation with the vibration. As the result, many of the conventional acoustic exciters demonstrate low operating efficiency, narrow sound reproduction range. There are problems in this sector still left to be solved; viz. the sound pressure and the quality of reproduced sounds.

Patent Document 1:

Japanese Patent Unexamined Publication No. S61-21699

SUMMARY OF THE INVENTION

An acoustic exciter in the present invention includes a magnetic circuit, a suspension connected to the magnetic circuit, a frame coupled to the suspension, a voice coil disposed in the magnetic gap of magnetic circuit, and a vibrator coupled to the voice coil. The vibrator and the frame are so coupled via an elastic body as to be able to move ups and downs relative to each other. The above-described acoustic exciter provides a broader sound reproduction range and a reduced attenuation of vibration.

REFERENCE MARKS IN THE DRAWINGS

Figure 1:
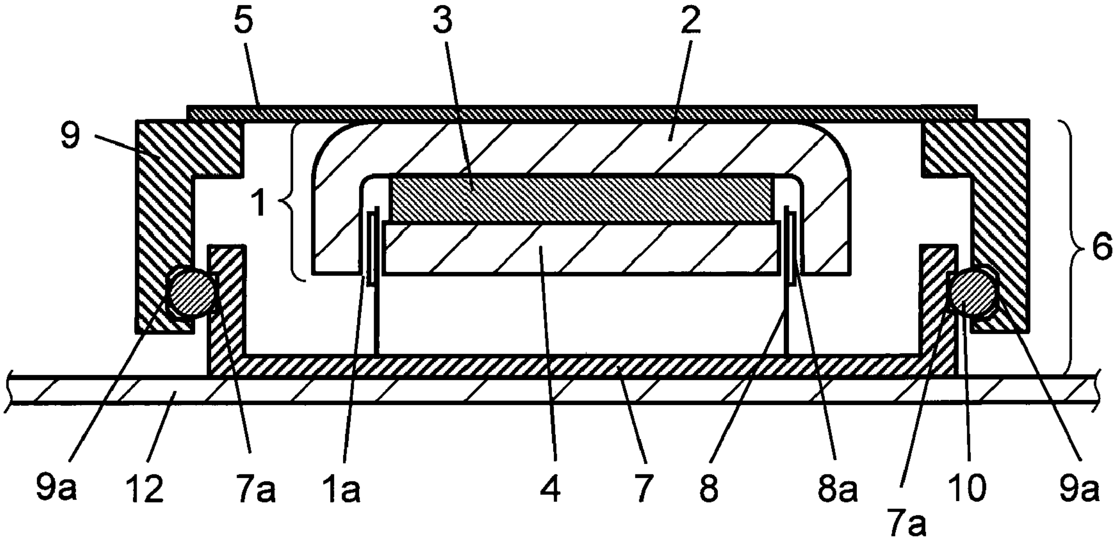
FIG. 1 shows a cross sectional side view of an acoustic exciter in accordance with a first exemplary embodiment of the present invention.

1 Magnetic Circuit
2 Yoke
3 Magnet
4 Plate
5 Suspension
6 Vibrating Unit 7, 19 Vibrator
7*a*, **19*a*** Hollow
7*b* Cushion Material
8 Voice Coil
9, 18 Frame
**9*a*, 18*a*** Hollow
10 Elastic Body
11 Glue
12 Flat Panel (Vibration Staff)
20 Acoustic Exciter
21 Case
22, **22*c*** Flange Section
**22*a*** Wall Part
**22*b*** Tapered Part
23 Lock Tooth
24 Bracket
25 Clamping Claw
26 Arm
**26*a*, 27** Protrusion
$C_g$, $C_{s1}$, $C_{s2}$ Compliance
$R_g$, $R_{s1}$, $R_{s2}$ Mechanical Resistance
V, $V_f$, $V_g$, $V_m$ Vibration Speed
$F_v$ Drive Force
$Z_e$ Electromagnetic Damping Resistance
$M_f$, $M_m$, $M_v$ Mass

DETAILED DESCRIPTION OF PREFERRED EMBODIMENTS

Exemplary embodiments of the present invention are described below referring to the drawings.

First Exemplary Embodiment

Figure 2:
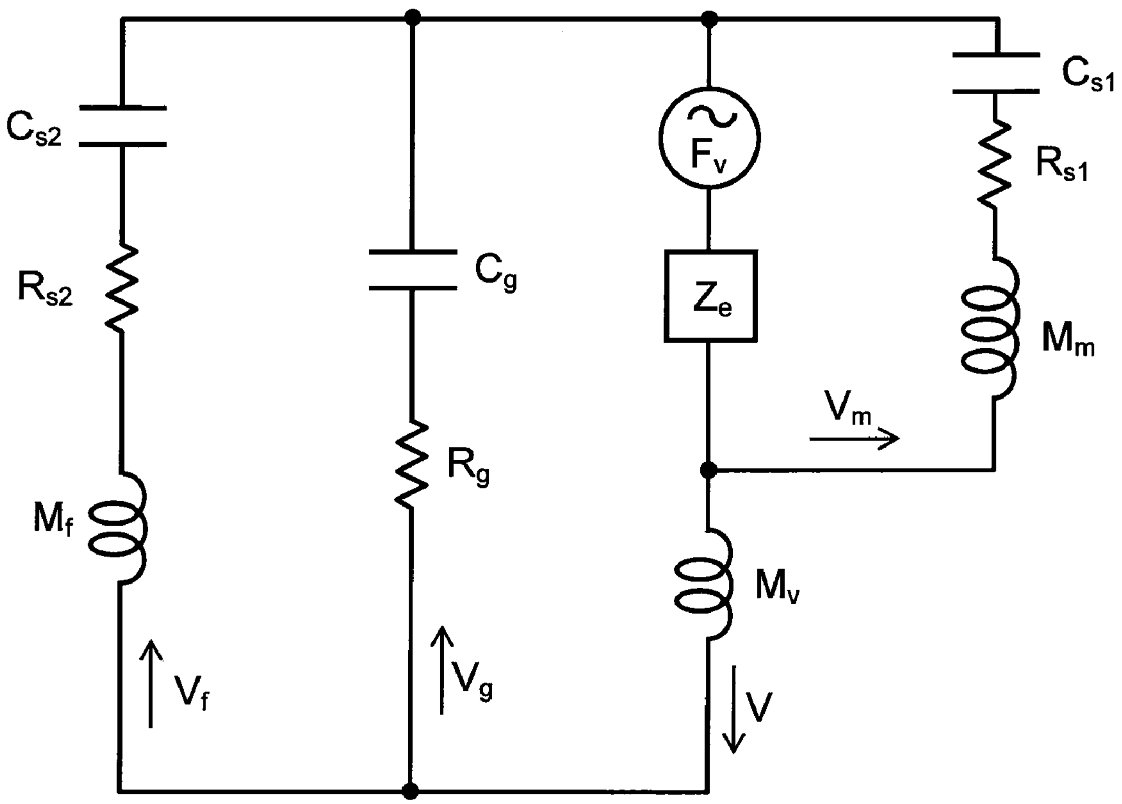
FIG. 2 is an equivalent circuit diagram which represents the mechanical system of the first embodiment.

An acoustic exciter is described in accordance with a first exemplary embodiment of the present invention, with reference to the drawings. FIG. 1 shows a cross sectional side view of an acoustic exciter in the present embodiment. FIG. 2 is an equivalent circuit diagram representing the mechanical system of the exciter.

Reference is made to FIG. 1. Frame 9 has an open part at both ends. Magnetic circuit 1 is provided by stacking and gluing magnet 3 and plate 4 on yoke 2. Magnetic circuit 1 is so supported by suspension 5, which is connected to one of the open ends of frame, as to be able to move ups and downs freely within the inside of frame 9. Voice coil 8 is disposed at its one end in magnetic gap la of magnetic circuit 1, while the other end is connected glued to vibrator 7 of a bottomed cylindrical shape disposed at the other end of frame 9. Thus the acoustic exciter is formed of frame 9, magnetic circuit 1, voice coil 8, and vibrator 7 which is connected to voice coil 8. Vibrating unit 6 is formed of frame 9, vibrator 7, voice coil 8, and elastic body 10 which will be described later.

Elastic body 10 is made of a rubber, or the like material, and has a ring shape. Elastic body 10 is disposed in the gap provided between frame 9 and vibrator 7, at the location of ring hollow **9*a* which is formed in the inner circumferential wall surface of frame 9 and ring hollow 7*a* which is formed on the circumferential wall of vibrator 7 opposing to ring hollow 9*a*. Elastic body 10 is so disposed between frame 9 and vibrator 7 as to be pressed against the frame and the vibrator. Frame 9 and vibrator 7 are thus coupled via elastic body 10. Vibrator 7 and frame 9 are provided with hollow 7*a* and 9*a*, respectively, in order to have elastic body 10** at right positioning.

An acoustic exciter in accordance with the present embodiment and that of conventional technology were compared under the same test conditions. An acoustic exciter in the present embodiment was fixed at vibrator 7 to flat panel 12, or a board-shaped vibration staff; while an acoustic exciter of conventional technology was fixed at the vibrator 227 side to the flat panel. As to method for attaching the exciter to flat panel 12, the two may be connected fixed either with an adhesive agent, or by providing vibrator 7/227 with screw holes and then using screw bolts. Any known connecting method may be used, in so far as it certainly conveys the vibration of vibrator 7/227 to a vibration staff.

Then, electrical sound signal was led to voice coil 8 of the exciter in the present embodiment, and to voice coil 228 of conventional exciter. From the results of the comparative experiments, it has been confirmed that the acoustic exciter in accordance with the present embodiment demonstrated a sound pressure improved by approximately 6 dB over that of conventional, and a broader range in the reproduced sounds.

FIG. 2 is an equivalent circuit diagram which represents the mechanical system of an acoustic exciter in the present embodiment. In the equivalent circuit diagram, drive force $F_v$ which is generated by magnetic circuit 1 and voice coil 8, and electromagnetic damping resistance $Z_e$ due to $F_v$ are shown in a series circuit. Suspension 5's compliance $C_{s1}$ to magnetic circuit 1; suspension 5's mechanical resistance $R_{s1}$ to magnetic circuit 1; and mass $M_m$ of magnetic circuit 1 and part of suspension 5 are shown in a series circuit. Also, mass $M_v$ of vibrator 7, voice coil 8 and part of elastic body 10 is shown. Suspension 5's compliance $C_{s2}$ to vibrating unit 6; suspension 5's mechanical resistance $R_{s2}$ to vibrating unit 6; and mass $M_f$ of frame 9, part of suspension 5 and part of elastic body 10 are shown in a series circuit. Also, elastic body 10's compliance $C_g$ and elastic body 10's mechanical resistance $R_g$ are shown in a series circuit. Magnetic circuit 1's vibration speed $V_m$, vibrator 7's vibration speed V, frame 9's vibration speed $V_f$, and elastic body 10's vibration speed $V_g$ are also given.

As shown in FIG. 2, elastic body 10's compliance $C_g$ and mechanical resistance $R_g$ are given in parallel with suspension 5's compliance $C_{s2}$ to vibrating unit 6; mechanical resistance $R_{s2}$; and mass $M_f$ of frame 9, part of suspension 5 and part of elastic body 10. Vibrator 7's vibration speed V is given as the sum of frame 9's vibration speed $V_f$ and elastic body 10's vibration speed $V_g$, ($V=V_f+V_g$). Therefore, as the results of introduction of elastic body 10, the vibration speed of vibrator 7 increases over the conventional, the exciting efficiency improves, and the sound pressure created by vibration of flat panel 12 increases. It is also confirmed on the equivalent circuit that, if elastic body 10's compliance $C_g$ is set at a certain appropriate value, the vibration in high frequency region can also be improved and the range of sound reproduction can be broadened as well.

This means that, vibrator 7 vibrates independent of frame 9 depending on the frequency; which is identical to the smaller vibration mass. The higher the compliance $C_g$ of elastic body 10, the faster the speed $V_g$ of elastic body 10 would be in a broader region. This, however, invites instability to the supporting of vibrator 7. Elastic body 10 should find an optimum value in the compliance $C_g$.

As illustrated in FIG. 1, vibrator 7 and frame 9 in the present embodiment are provided respectively with hollow (**7*a*, 9*a*) for setting a right position for elastic body 10. The cross sectional length of elastic body 10 is made to be moderately greater than the gap provided between vibrator 7 and frame 9. By so designed, vibrator 7 is held surely by a pressure contact of elastic body 10. The stability of voice coil 8 operating in magnetic circuit 1 is also improved. As to the material for elastic body 10**, those which exhibit stable physical property and high heat-withstanding capability are preferred, taking into consideration the hard operating environment such as car-born applications. A material among silicone rubber system, for example, may be preferred.

Although a rubber material, e.g. a silicone system rubber, has been described as the preferred material suitable for elastic body 10 in the present embodiment, it should not be interpreted as limiting. A material may be chosen from among those, inclusive of silicone system rubber, having a rubber hardness not lower than 20 Shore and not higher than 60 Shore. Elastic body 10 of an optimum compliance may be made available out of those materials.

An adhesive agent that keeps elasticity after hardening may be used for elastic body 10. It is also possible to form elastic body 10 by coating, or filling, glue 11 that keeps elasticity after hardening in at least those gaps between frame 9 and elastic body 10 and between vibrator 7 and elastic body 10.

A silicone system rubber, for example, seems to be an ideal material for the glue because of it has a suitable viscosity, stable physical properties and a high heat-withstanding capability. As compared to an elastic body in a solid state, the above-described glue would be advantageous for reducing the material cost.

Figure 3:
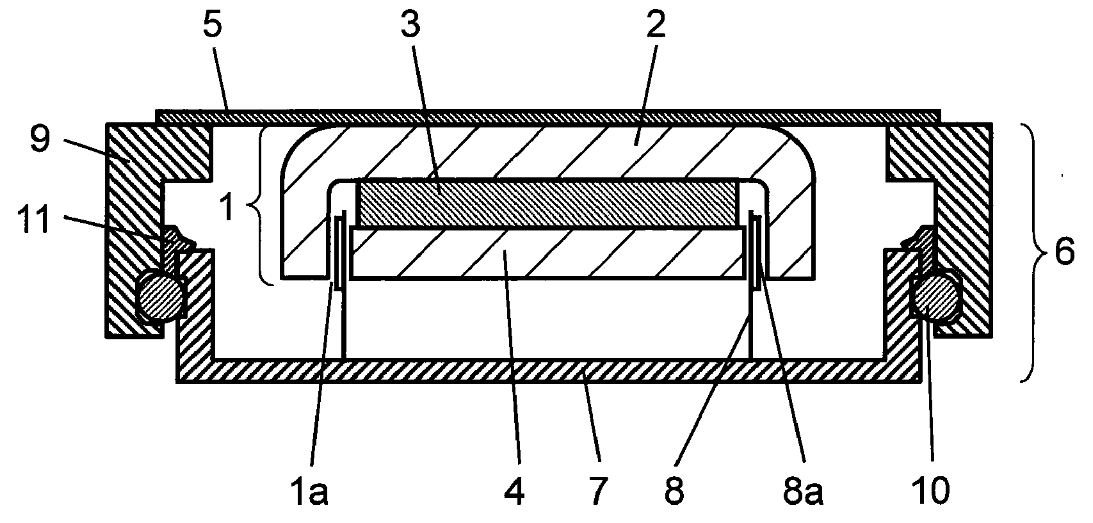
FIG. 3 is a cross sectional side view which shows other application sample of the first embodiment.

FIG. 3 shows a cross sectional side view of other acoustic exciter which is other exemplary development of the present embodiment. Those portions identical to those of FIG. 1 are designated using the same numerals, and detailed description of which portions are eliminated. The point of difference from acoustic exciter of FIG. 1 is that, whereas vibrator 7 and frame 9 in the first embodiment shown in FIG. 1 have been coupled via elastic body 10, the exciter of FIG. 3 is further provided with glue 11, which is so disposed on elastic body 10 as to bridge vibrator 7 and frame 9. This contributes to further improve the stability of supporting vibrator 7, and enhance the operational reliability.

As to preferred material for glue 11, it should be selected from among those which maintain after hardening the elasticity, the stable characteristics and the high heat-withstanding capability. An adhesive agent of silicone rubber system, for example, may be a suitable material.

The above-structured acoustic exciter is connected at vibrator 7 to flat panel 12, or a vibration staff. Sound signals from an external source are led to voice coil 8, and the acoustic exciter vibrates accordingly. Thus a speaker is formed by the acoustic exciter in combination with the vibration staff which vibrates in accordance with the vibration of exciter and generates sounds.

Second Exemplary Embodiment

Figure 4:
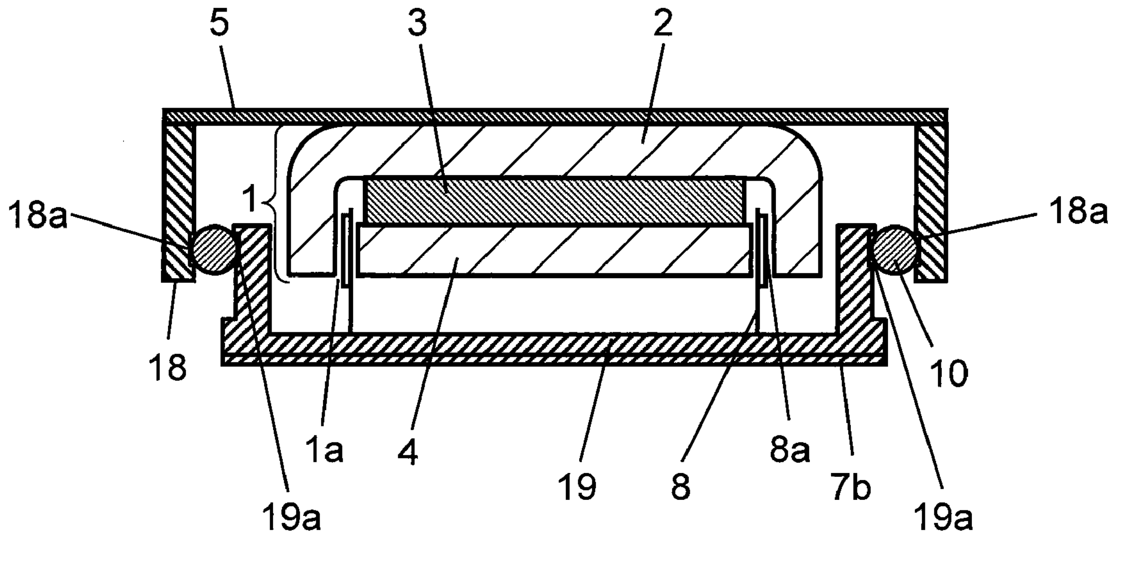
FIG. 4 shows a cross sectional side view of an acoustic exciter in accordance with a second exemplary embodiment of the present invention.
Figure 5:
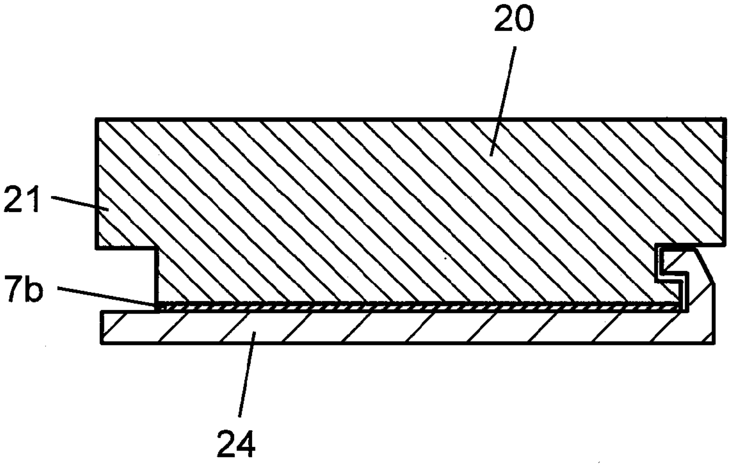
FIG. 5 is a cross sectional side view used to describe the mounting of an acoustic exciter in the second embodiment on a bracket, which bracket being the key element of a vibration staff of a sound reproduction apparatus implemented in combination with the acoustic exciter.
Figure 6A:
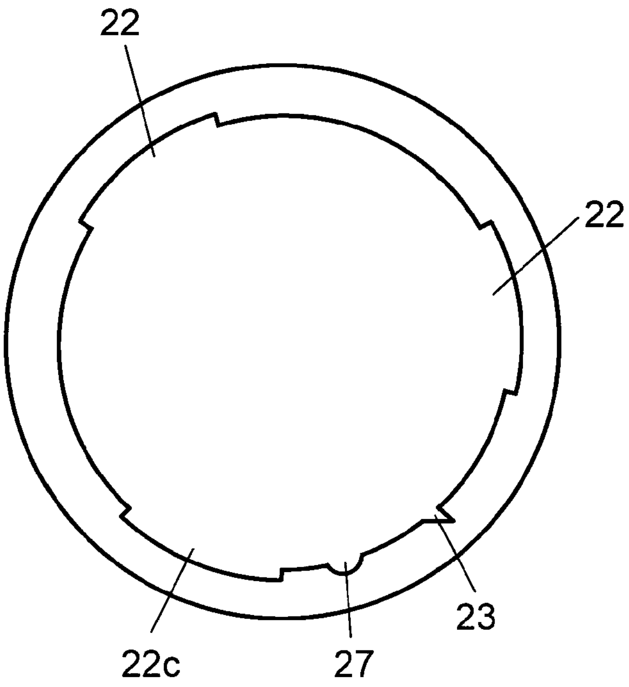
FIG. 6A is a bottom view of a frame section, which being the key part of an acoustic exciter in the second embodiment.
Figure 6B:
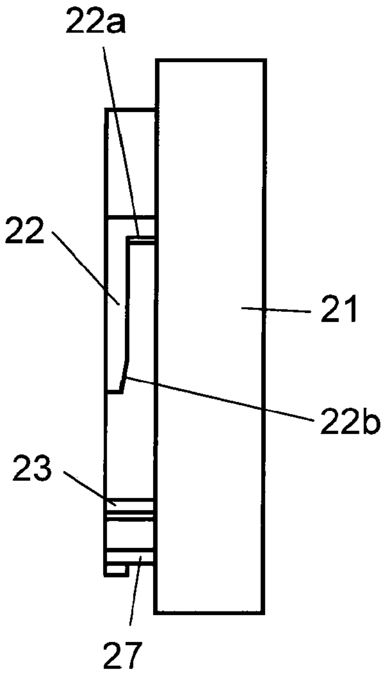
FIG. 6B shows the side view of acoustic exciter in the second embodiment.
Figure 7A:
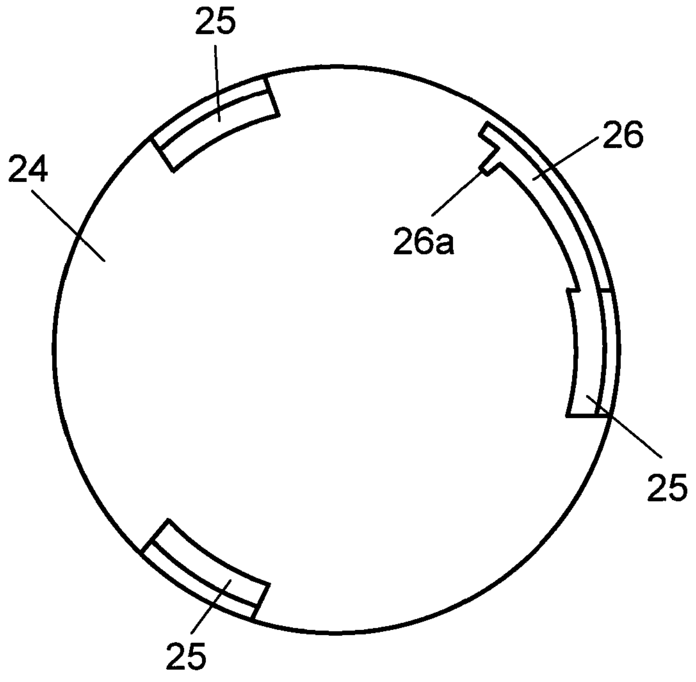
FIG. 7A shows a bracket as viewed from the above, which bracket being the key part of an acoustic exciter in the second embodiment.
Figure 7B:
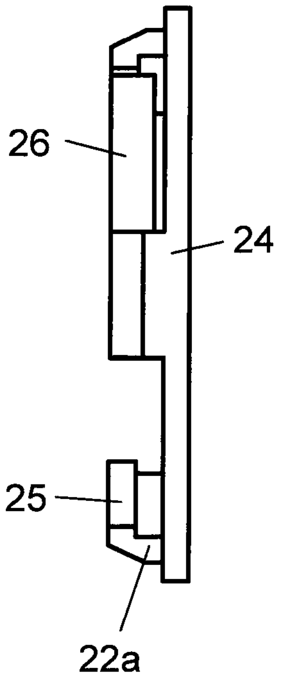
FIG. 7B is the side view of the bracket.
Figure 7C:
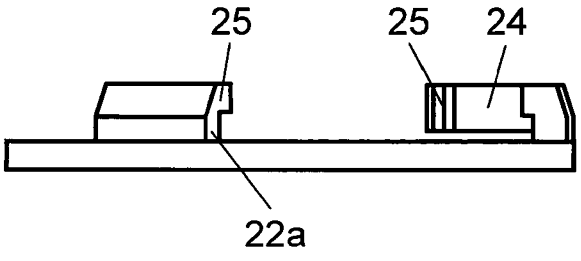
FIG. 7C shows other side view of the bracket, as viewed from the direction revolved for a 90 degree.
Figure 8:
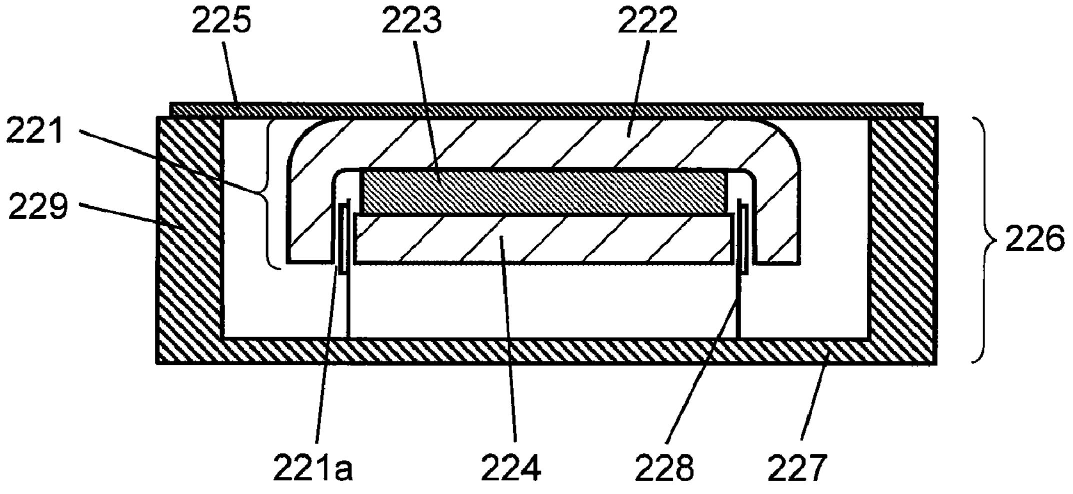
FIG. 8 PRIOR ART
FIG. 8 is a cross sectional side view of a conventional acoustic exciter.
Figure 9:
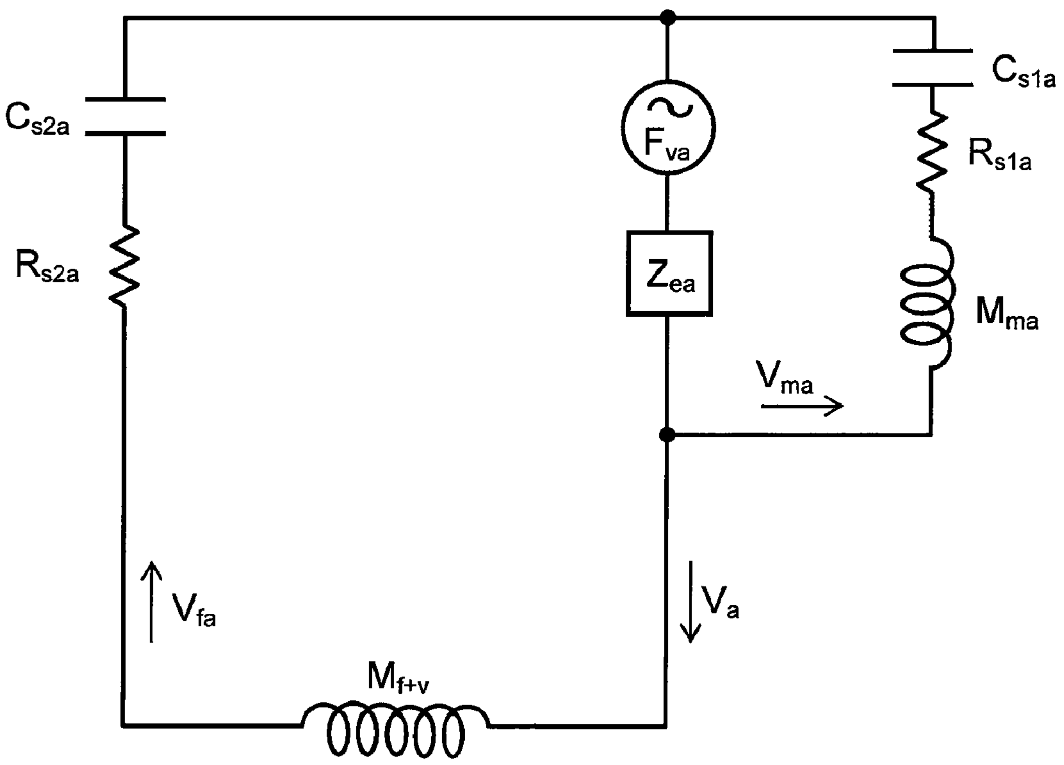
FIG. 9 PRIOR ART
FIG. 9 is an equivalent circuit diagram which represents the mechanical system of the conventional acoustic exciter.

A second exemplary embodiment of the present invention is described referring to FIG. 4 through FIG. 7C. FIG. 4 shows a cross sectional side view of an acoustic exciter in accordance with the present embodiment. FIG. 5 is a cross sectional side view used to describe the mounting of acoustic exciter in the present embodiment with a bracket, which bracket being the key element of a vibration staff of a sound reproduction apparatus formed in combination with the acoustic exciter. FIG. 6A shows a bottom view of frame, which being a key part of the present embodiment, FIG. 6B is the side view. FIG. 7A shows the bracket as viewed from the above, which bracket being a key part of the present embodiment, FIG. 7B is the side view. FIG. 7C is other side view, as seen from a direction revolved by a 90 degree from that of FIG. 7B.

The main feature with an acoustic exciter in the present embodiment is in a structure provided to make connection of the acoustic exciter and vibration staff more effective. In the following description, those portions identical to those of the first embodiment are designated using identical numerals.

As shown in FIG. 4, magnetic circuit 1 is formed by gluing magnet 3 and plate 4 on yoke 2. Magnetic circuit 1 is coupled to one of the open ends of cylindrical frame 18 via suspension 5 which is made of a thin elastic metal plate.

Voice coil 8 is connected glued at one end with vibrator 19 of a bottomed cylindrical shape. The other end of voice coil 8 is coil section 8*a*, which is disposed in magnetic gap la of magnetic circuit 1.

Frame 18 and vibrator 19 in the present embodiment are provided, respectively, by resin molding. Elastic body 10 of a ring shape is disposed in a space formed by circumferential hollow 18*a* of frame 18 and vibrator 19's circumferential hollow 19*a* which is the counterpart of hollow 18*a*. Like in the first embodiment, vibrator 19 is coupled via an elastic contact provided by elastic body 10 with frame 18, magnetic circuit 1 is connected to the frame via suspension 5. Vibrator 19 of a bottomed cylindrical shape is provided at the bottom surface with cushion material 7*b*. Cushion material 7*b* will be detailed later.

Now, reference is made to FIG. 5 to describe attaching of the acoustic exciter 20 to a vibration staff. As shown in FIG. 5, acoustic exciter 20 is housed in case 21, which appears to contain frame 18 and vibrator 19.

As illustrated in FIGS. 6A and 6B, flange section 22 is pushing out from the bottom surface of cylindrical case 21 in line with the circumferential direction to form a circular arc. It is provided for a plurality. Namely, a plurality of flange section 22 is provided, pushing out from the cylinder bottom of vibrator 19 in line with the circumferential direction. Flange section 22 is provided at one end in the circular direction with wall part 22*a*. Case 21 is provided on the outer circumference with lock tooth 23, which is a protrusion with one side tapered whereas the other side forming an upright wall.

Now, reference is made to FIG. 7A, FIG. 7B and FIG. 7C. Resin-made bracket 24 is fixed to a vibration staff (not shown). Bracket 24 is provided with a plurality of clamping claw 25 at those locations which correspond to flange section 22. Bracket 24 and case 21 are fit together, when case 21 is revolved flange section 22 is caught by clamping claw 25 to be fixed.

Tapered part 22*b* of flange section 22 facilitates easy clamping by clamping claw 25. As the moment when wall part 22*a* of flange section 22 reaches clamping claw 25 to have direct contact, the mounting of acoustic exciter with the vibration staff is completed.

Clamping claw 25 of bracket 24 is provided at the upper part with arm 26, which arm is extending from the upper part of clamping claw in line with the circumferential direction. The extending arm 26 is provided at its end part with protrusion 26*a* which is protruding inward. In the above-described structure, when acoustic exciter is revolved for having its flange section 22 clamped by bracket 24's clamping claw, protrusion 26*a* provided at the end of arm 26 slides along the tapered part of lock tooth 23 and then drops into the wall part. In the course of mounting flange section 22 into bracket 24, the state of a completed mounting operation can be perceived with a click (locked) feeling. The state of flange section 22 being fixed by claming claw 25 can not be released inadvertently. The clamped state can only be released by lifting the end of arm 26 with a jig, or the like tool, and revolving case 21 in the counter direction.

Case 21 is provided with cushion material 7*b* disposed at the bottom surface. A redundant play between case 21 of a mounted acoustic exciter 20 and bracket 24 is absorbed by cushion material 7*b* compressed. Thus the stability of holding between acoustic exciter 20 and bracket 24 is further enhanced by cushion material 7*b* which absorbs a play between flange section 22 and clamping claw 25.

As described in the above, acoustic exciter 20 can be connected easily with a vibration staff by having flange section 22 of acoustic exciter 20's case 21 clamped with claw 25 of the vibration staff. And, protrusion 26*a* of arm 26 and lock tooth 23 ensure a highly reliable coupling which can not be released easily.

Besides lock tooth 23, protrusion 27 of a small half-spherical shape is provided in the present embodiment for notifying mounting/demounting position, at a place between the lock tooth and other flange section 22*c*. When acoustic exciter 20 is revolved for decoupling, protrusion 26*a* of arm 26 has to override protrusion 27. The overriding can be perceived in a light click feeling. Thereby, an operator can easily know the right position of acoustic exciter 20 for demounting. This would be advantageous in preventing a possible damage to be incurred on arm 26 due to over revolving of acoustic exciter 20.

Consequently, during mounting of acoustic exciter 20 to bracket 24, an operator feels a small clicking when protrusion 26*a* of arm 26 overrides protrusion 27, and then, after a further revolution, a greater one (locked feeling) when it overrides lock tooth 23, the latter notifies completion of a mounting operation.

Instead of protrusion 27 provided in the present embodiment for creating a light click feeling as the sign of right decoupling position with acoustic exciter 20, a small hollow for clicking may be provided in the outer circumferential surface of vibrator 19.

Industrial Applicability

An acoustic exciter in the present invention is expected to find a wide application field in the flat panel speaker sector, among others. In combination with various types of vibration staffs such as ceiling panels, wall boards, etc., the acoustic exciter can implement various types of car-born or home-use sound apparatus of new concept.

The invention claimed is:

1. An acoustic exciter comprising a frame having opening parts provided at both ends, respectively, a suspension coupled to one of the opening parts of the frame, a magnetic circuit so supported by the suspension as to be able to move up and down freely within the inside of the frame, a voice coil having one end and an other end, said one end of the voice coil being disposed of a magnetic gap of the magnetic circuit, a vibrator connected with the other end of the voice coil, and an elastic body disposed between the vibrator and the frame, the elastic body providing a pressure against the vibrator and the frame, respectively, and the vibrator being fitted approximately inside of the frame.

2. The acoustic exciter of claim 1, wherein the vibrator and the frame are provided, respectively, with a hollow at the place where the elastic body is to be positioned for giving pressure contact.

3. The acoustic exciter of claim 1, wherein the material of elastic body is a rubber having rubber hardness not lower than 20 Shore and higher than 60 Shore.

4. The acoustic exciter recited in claim 1, 2 or 3, wherein the elastic body is a glue that keeps elasticity after hardening.

5. The acoustic exciter of claim 1, wherein spaces at least between the frame and the elastic body and between the vibrator and the elastic body are applied with a glue that keeps elasticity after hardening.

6. The acoustic exciter of claim 1, wherein the vibrator is a cylindrical-shaped vibrator, and further comprising a flange section provided at the bottom surface of the cylindrical-shaped vibrator, and a resin-made bracket fixed firm to a vibration staff which generates sounds when vibrated, wherein the flange section is provided in a plurality, which is pushing out from the bottom surface of the cylindrical vibrator in line with the circumferential direction, the bracket is provided with a clamping claw at the places that correspond to the flange section, and the flange section is clamped by the clamping claw when the bracket and the cylindrical part are coupled together and revolved to each other.

7. The acoustic exciter of claim 6, wherein the clamping claw of the bracket is provided at the upper part with an arm which is extending in line with the circumferential direction, the arm is provided at the end part of extension with a protrusion protruding inward, the vibrator is provided at the outer circumferential wall with a lock tooth, the tooth being tapered at one side while forming an upright wall at the other side, and when revolved in order to have the flange section clamped by the clamping claw of bracket, the protrusion provided at the end of extension of the arm drops in the upright wall side of the lock tooth after sliding along the tapered side.

8. The acoustic exciter of claim 7, wherein the vibrator is provided at the outer circumferential wall with a small protrusion, or a small dent, that can be easily overridden by the protrusion provided at the extended end of arm, at a certain place at least in the direction of revolution for mounting with respect to the location where the bracket's arm-end protrusion resides at the coupling insertion of the flange section into the bracket.

9. A speaker which comprises the acoustic exciter of claim 1 and a vibration staff connected to the vibrator of acoustic exciter.

10. An acoustic exciter comprising a cylindrical-shaped vibrator, a frame having opening parts at both ends, an elastic body disposed between the cylindrical-shaped vibrator and the frame providing a pressure against the cylindrical-shaped vibrator and the frame, respectively, and the vibrator being fitted approximately inside of the frame, a flange section provided at the bottom surface of the cylindrical-shaped vibrator, and a resin-made bracket fixed firm to a vibration staff, wherein, the flange section is provided in a plurality, which is pushing out from the bottom surface of the cylindrical-shaped vibrator in line with the circumferential direction, the bracket is provided with a clamping claw, at the places that correspond to the flange section, the flange section is clamped by the clamping claw when the bracket and the cylindrical part are coupled together and revolved to each other.

11. The acoustic vibration unit of claim 10, wherein the clamping claw of the bracket is provided at the upper part with an arm extending in line with the circumferential direction, the arm is provided at the end part of extension with a protrusion protruding inward, the vibrator is provided at the outer circumferential wall with a lock tooth, the tooth being tapered at one side while forming an upright wall at the other side, when revolved in order to have the flange section clamped by the clamping claw of bracket, the protrusion provided at the end of extension of the arm drops in the upright wall side of the lock tooth after sliding along the tapered side.

12. The acoustic exciter of claim 11, wherein the vibrator is provided at the outer circumferential wall with a small protrusion, or a small dent, that can be easily overridden by the protrusion provided at the extended end of the arm, at a certain place at least in the direction of revolution for mounting with respect to the location where the bracket's arm-end protrusion resides at the coupling insertion of the flange section into the bracket.

* * * * *